(12) United States Patent
Kim et al.

(10) Patent No.: US 6,874,334 B2
(45) Date of Patent: Apr. 5, 2005

(54) AIR CONDITIONING SYSTEM

(75) Inventors: Kyung Hwan Kim, Seoul (KR); Ho Seon Choi, Seoul (KR); Gi Seop Lee, Incheon-si (KR)

(73) Assignee: LG Electronics Inc, Seoul (KR)

( * ) Notice: Subject to any disclaimer, the term of this patent is extended or adjusted under 35 U.S.C. 154(b) by 0 days.

(21) Appl. No.: 10/754,514

(22) Filed: Jan. 12, 2004

(65) Prior Publication Data

US 2004/0250561 A1 Dec. 16, 2004

(30) Foreign Application Priority Data

Jun. 11, 2003 (KR) .................................. 10-2003-0037653

(51) Int. Cl.$^7$ .............................................. F25D 17/06
(52) U.S. Cl. ........................................ 62/412; 62/418
(58) Field of Search ........................... 62/411, 412, 417, 62/418, 407, 404, 259.1; 454/296

(56) References Cited

U.S. PATENT DOCUMENTS 5,595,068 A * 1/1997 Amr ............................ 62/418
6,131,653 A * 10/2000 Larsson ....................... 165/228

OTHER PUBLICATIONS

U.S. Appl. No. 10/754,599 to Yum et al., entitled "Air Conditioning System," which was filed on Jan. 12, 2004.
U.S. Appl. No. 10/682,972 to Park et al., entitled "Multi-Type Air Conditioner," which was filed on Oct. 14, 2003.
U.S. Appl. No. 10/754,579 to Lee et al., entitled "Air Conditioning System," which was filed on Jan. 12, 2004.
U.S. Appl. No. 10/694,017 to Lee et al., entitled "Combined Ventilating and Air Conditioning System," which was filed on Oct. 28, 2003.

* cited by examiner

*Primary Examiner*—Melvin Jones
(74) *Attorney, Agent, or Firm*—Greenblum & Bernstein, P.L.C.

(57) ABSTRACT

Air conditioning system including an outdoor unit, a compact indoor unit, air supply duct, air discharge duct, and preheat exchanger. An indoor heat exchanger in the indoor unit has a space therein in communication with a room, a fan in the indoor unit provided in the space draws air and discharges through the indoor heat exchanger. A ventilation guide duct in the indoor unit is provided on an underside of the indoor heat exchanger for guiding the external air to the room through the fan, and the room air to the outside of the room. The air supply duct and the air discharge duct have one ends connected to the ventilation guide duct for guiding the external air to the room, and the room air to the outside of the room, respectively. The preheat exchanger is provided in the middle of the air supply duct and the air discharge duct, for indirect heat exchange of the external air and the room air passing through the air supply duct and the air discharge duct.

23 Claims, 10 Drawing Sheets

AIR CONDITIONING SYSTEM

This application claims the benefit of the Korean Application No. P2003-37653 filed on Jun. 11, 2003, which is hereby incorporated by reference.

BACKGROUND OF THE INVENTION

1. Field of the Invention

The present invention relates to air conditioning systems, and more particularly, to an air conditioning system, in which an indoor unit installed on a ceiling, and a duct for ventilation are combined into one compact unit.

2. Background of the Related Art

The air conditioner is an appliance for cooling or heating a room by using a property of refrigerant in which the refrigerant discharges or absorbs heat to/from an environment when the refrigerant undergoes a phase change.

In general, the aid conditioner is provided with an indoor unit and an outdoor unit, wherein the air conditioner having the indoor unit and the outdoor unit combined into one unit is called as a unit type air conditioner, and the air conditioner having the indoor unit and the outdoor unit fabricated individually is called as a separate type air conditioner.

As a typical example of the unit type air conditioner, there is a window type air conditioner, and as the separate type air conditioners, there are a ceiling type air conditioner, a wall mounting type air conditioner, and a package type air conditioner. In a case of the ceiling type air conditioner, the indoor unit is installed in the ceiling, in a case of the wall mounting type, the indoor unit is mounted on a wall, and in a case of the package type air conditioner, the indoor unit stands on a floor in a room.

In general, the air conditioner includes a compressor, a condenser, an expansion device, and an evaporator. The compressor compresses low temperature/low pressure gas refrigerant to high temperature/high pressure refrigerant, and makes the refrigerant to pass through different units. The condenser condenses the gas refrigerant from the compressor into a liquid refrigerant. In this instance, as the refrigerant discharges heat when the refrigerant is condensed, the condenser discharges heat to an environment. As the heat is discharged from the condenser to the room, the room can be heated.

In general, as the expansion device, expanding the condensed refrigerant by decompression, capillary tubes are used. The evaporator vaporizes the expanded refrigerant, when the refrigerant absorbs heat to cool down air around the evaporator. When such a cooled down is discharged to the room, the room can be cooled down.

In the meantime, for reducing heat loss during use of the air conditioner, the room is closed. Air in such a closed room is polluted gradually as time passes by. For an example, breathing of persons in the room makes a carbon dioxide content in the room air higher, and there is much dust circulating in the dry air. Therefore, after using the air conditioner for a time period, it is required to supply fresh external air to the room. What is used for this is the very ventilation device.

Most of known related art ventilation device employs a system in which room air is only discharged to an outside of the room forcibly by using a fan. In this case, it is required to leave the window open for ventilation. However, when the room air is only discharged by one fan forcibly, cold or hot air is discharged to the outside directly, and external air is introduced into the room through an opened door or window, directly. Accordingly, there is a great loss of heat in the ventilation, to require, not only much energy, but also a long time to cool or heat the room again.

Moreover, the sudden introduction of hot or cold air from the outside to the inside of the room causes a sudden change of a room temperature, such that persons in the room feel unpleasant. Moreover, the opening of door or window without fail required when the ventilation device that discharges room air to outside of the room is in operation causes inconvenience.

SUMMARY OF THE INVENTION

Accordingly, the present invention is directed to an air conditioning system that substantially obviates one or more of the problems due to limitations and disadvantages of the related art.

An object of the present invention is to provide an improved air conditioning system which can recover heat from air discharged to an outside of room during ventilation.

Other object of the present invention is to provide an improved air conditioning system which can be installed more easily as duct for guiding ventilated air and an indoor unit combined into a compact unit.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the air conditioning system includes an outdoor unit, a compact indoor unit in a ceiling having a ventilation duct, air supply ducts, air discharge ducts, and preheat exchanger.

The outdoor unit includes a compressor and an outdoor heat exchanger, and the indoor unit includes an indoor heat exchanger, a fan, and the ventilation guide duct. The indoor heat exchanger has a space therein in communication with a room, the fan provided in the space draws air and discharges through the indoor heat exchanger. The ventilation guide duct is provided on an underside of the indoor heat exchanger for guiding the external air to the room through the fan, and the room air to the outside of the room. The air supply duct and the air discharge duct have one ends connected to the ventilation guide duct for guiding the external air to the room, and the room air to the outside of the room, respectively. The preheat exchanger is provided in the middle of the air supply duct and the air discharge duct, for indirect heat exchange of the external air and the room air passing through the air supply duct and the air discharge duct.

The fan includes a centrifugal fan that draws air from under and discharges in a radial direction as the fan rotates.

The ventilation guide duct includes at least one or more than one first flow passage in communication with the space, the room, and the air supply duct, for guiding the room air and the external air to the fan, at least one or more than one second flow passage for guiding the air passed through the fan and the indoor heat exchanger to the room, and at least one or more than one third flow passage for guiding the room air to the air discharge duct.

The air supply duct and the air discharge duct include at least one or more than one branch ducts connected to the first flow passage and the third flow passage, respectively. In this case numbers of the branch ducts of the air supply duct and the air discharge duct may, or may not same.

The ventilation guide duct may include a duct body on an underside of the indoor heat exchanger, and a panel attached to an underside of the duct body.

The duct body includes a first hole in a central part thereof passed in an up/down direction to form a part of the first flow passage and in communication with the air supply duct, a second hole around the first hole passed in the up/down direction to form a part of the second flow passage, and a third hole around the first hole passed in the up/down direction to form a part of the third flow passage in communication with the air discharge duct.

The duct body includes first ducts arranged to surround a central part to form a cavity in the central part that is in communication with the space and the room, each of the first ducts having an inside forming a part of the second flow passage, and the compartment plate arranged to divide the cavity into the first flow passage and the third flow passage. The duct body may further include connection plates connected between side ends of adjacent first ducts, and the air supply duct or the air discharge duct is connected thereto selectively.

The first flow passage is formed in a central part of the cavity, and the third flow passage is formed inside of a corner at which the first ducts are connected. In this case, it is preferable that the compartment plate has two ends connected to adjacent two first ducts.

The panel may include a first port forming parts of the first and third flow passages, and a second port forming a part of the second flow passage. The panel may further include a mesh provided to the first port.

The fan is provided over the first hole, and the indoor heat exchanger preferably stands on the duct body along a position between the first hole and the second hole.

The air conditioning system may further include an air supply fan on the air supply duct for supplying external air into the room, or an air discharge fan on the air discharge duct for discharging room air to an outside of the room.

The air conditioning system may further include dampers for controlling flow rates of the external air supplied to the room, or the room air discharged to the outside of the room through the air supply duct or the air discharge duct. The dampers may be mounted in the air supply duct and the air discharge duct respectively, or in a part the air supply duct or the air discharge duct is connected to the ventilation guide duct.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments, same parts will be given the same names and reference symbols, and repetitive description of which will be omitted.

The air conditioning system of the present invention provides a ceiling type air conditioner in which an indoor unit is installed in a ceiling. The air conditioning system of the present invention ventilates room air, during which the air supplied to a room recovers heat from the air discharged to an outside of room.

The air conditioning system of the present invention will be described with reference to the attached drawings, in more detail. For reference, FIG. 1 illustrates an air conditioning system in accordance with a preferred embodiment of the present invention schematically, and FIG. 2 illustrates a view of the air conditioning system in FIG. 1 installed on a ceiling looked up from below.

Figure 1:
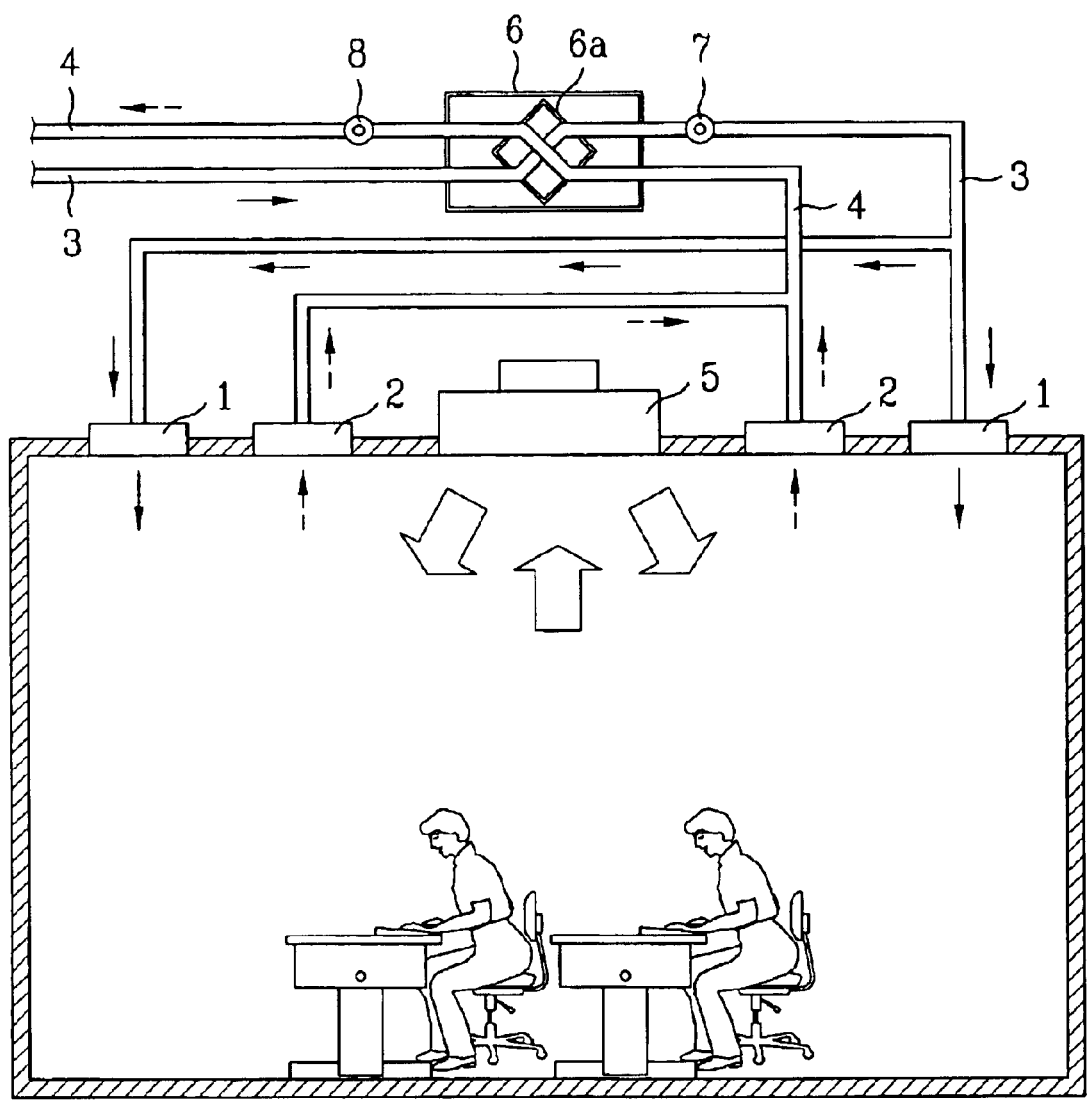
FIG. 1 illustrates an air conditioning system in accordance with a preferred embodiment of the present invention, schematically.
Figure 2:
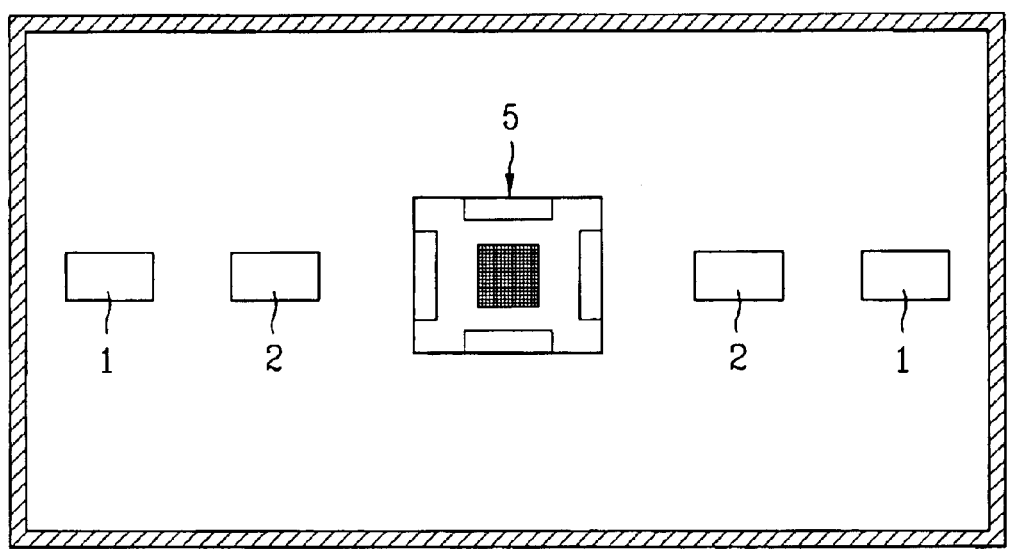
FIG. 2 illustrates a view of the air conditioning system in FIG. 1 installed on a ceiling looked up from below.

Referring to FIG. 1, an indoor unit 5 is installed in the ceiling of a room so as to be in communication with the room. The indoor unit 5 includes an indoor heat exchanger (not shown), an indoor expansion device (not shown), and an indoor fan (not shown). As shown in FIG. 2, there are a plurality of air discharging ports and air supply ports 1 in the ceiling in the room at points predetermined distances away from the indoor unit 5. The air discharge duct 4 is connected to the air discharge port 2, and the air supply duct 3 is connected to the air supply port 1. One ends of the air supply duct 3 and the air discharge ducts 4 are connected to the outside of the room. There is a preheat exchanger 6 in the middle of the air supply duct 3 and the air discharge duct 4 for indirect heat exchange of external air and room air flowing therein while the external air and the room air cross each other.

A structure and operation of the preheat exchanger 6 will be described in more detail with reference to FIGS. 3 and 4. For reference, FIG. 3 illustrates heat exchange between external air and room air in the air conditioning system in FIG. 1 schematically, and FIG. 4 illustrates a perspective view of heat exchange means in a preheat exchanger in FIG. 3 in accordance with a preferred embodiment of the present invention.

Figure 3:
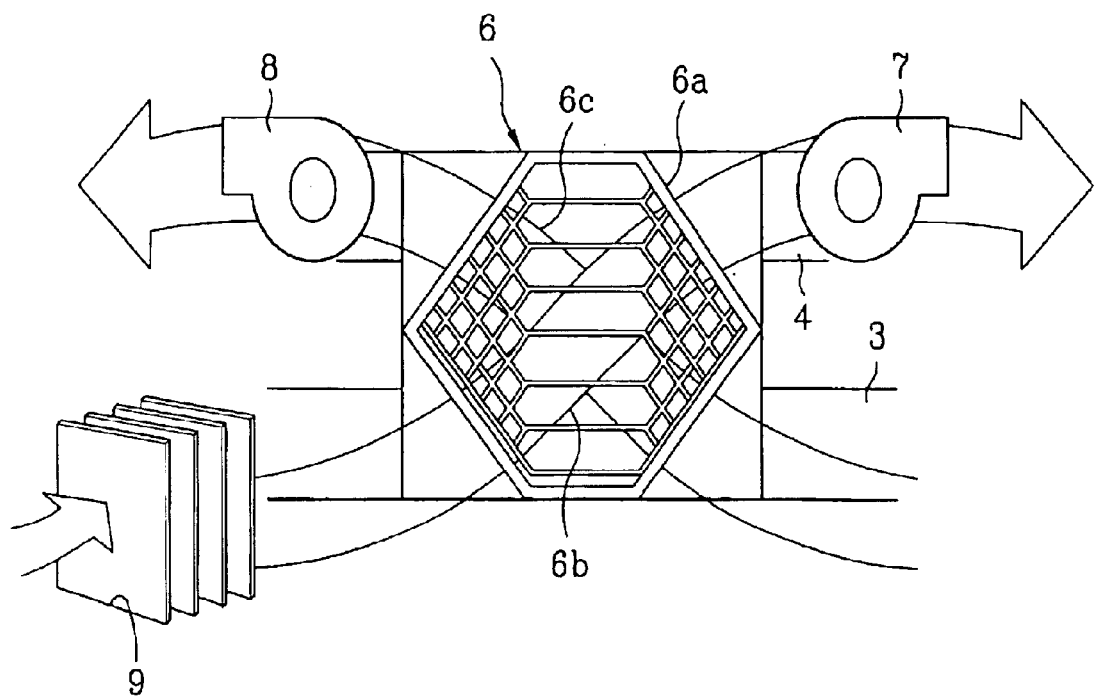
FIG. 3 illustrates heat exchange between external air and room air in the air conditioning system in FIG. 1, schematically.

Referring to FIG. 3, the preheat exchanger 6 is provided with heat exchange means 6a, including a plurality of first flow passages 6b for guiding the external air to the room, and a plurality of second flow passages 6c for guiding the room air to the outside of the room. The first flow passages 6b, connected to the air supply duct 3 and the second flow passages 6c, connected to the air discharge duct 4, are separated with a plurality of plates so as not to be in communication. Since the first flow passage 6b and the second flow passage 6c are formed between the plates, heat transfers through the plate when the external air and the room air pass through the first flow passage 6b and the second flow passage 6c, respectively. According to this, the external air introduced into the room through the first flow passage 6b receives thermal energy from the room air discharged to the outside of the room through the second flow passage 6c. Therefore, the air conditioning system of the present invention can reduce an energy loss in ventilation. In the meantime, an unexplained reference symbol 9 in FIG. 3 denotes a filter, for filtering the external air introduced into the room from the outside.

Figure 4:
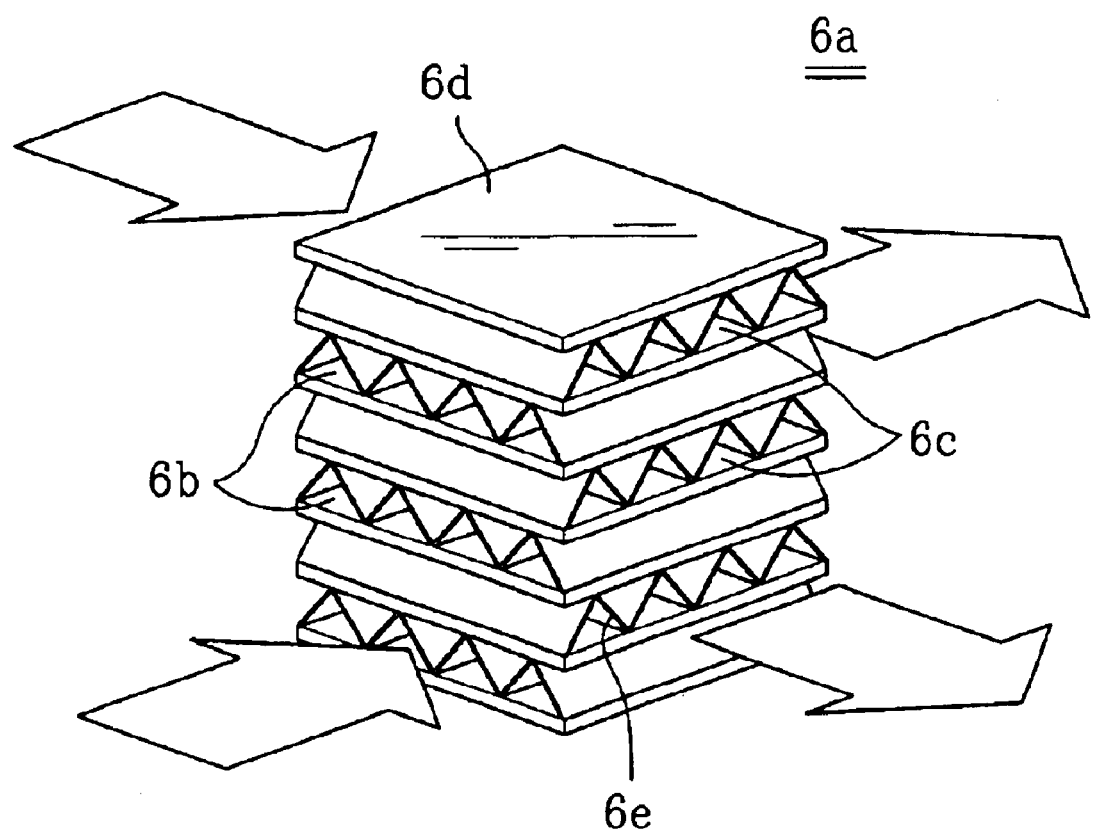
FIG. 4 illustrates a perspective view of heat exchange means in a preheat exchanger in FIG. 3 in accordance with a preferred embodiment of the present invention.

FIG. 4 illustrates an embodiment of the heat exchange means 6a. Referring to FIG. 4, the one embodiment of the heat exchange means 6a includes a plurality of plates 6d and a plurality of flow guides 6e. The plates 6d are arranged at regular intervals such that the first guide passage 6b for flow of the external air and the second guide passage 6c for flow of the room air are formed in layers, alternately.

The flow guide 6e serves to fix flow directions of the air flow in the first guide passage 6b and the second guide passage 6c, and to make a heat exchanger area larger. The flow guide 6e includes a section having a plurality of continuous folds, of which peaks and bottoms are in contact with a top surface and a bottom surface of each of the plates, respectively. In the meantime, as shown in FIG. 4, the flow guides 6e in the layers may be arranged perpendicular to each other so that the external air and the room air flow perpendicular to each other.

In the meantime, the heat exchange means is not limited to the embodiments described with reference to FIG. 4, but any structure is acceptable as the heat exchange means as far as the structure permits indirect heat exchange of the external air and the room air without mixed to each other.

There can be two kind of methods for indirect heat exchange between the external air and the room air at the preheat exchanger 6. One is heat exchange by means of heat conduction made through the plate 6d and the flow guide 6e that divide the first guide passage 6b and the second guide passage 6c. The other one is heat exchange by means of condensed water formed on the plate 6d due to a temperature difference between the first guide passage 6b and the second guide passage 6c.

In the meantime, in the air conditioning system in FIG. 1, the air supply fan 7 and the air discharge fan 8 are mounted on the air supply duct 3 and the air discharge duct 4. The outdoor unit (not shown) in the outdoor includes an outdoor heat exchanger, a compressor, an outdoor fan, which are generally known, and no more description of which will be given.

In the operation, referring to FIG. 1, when the outdoor unit and the indoor unit 5 are put into operation, the room air is introduced into the indoor unit 5, heat exchanges with the indoor heat exchanger, and discharged to the room, again. According to this, the room is cooled or heated. After the room is cooled or heated for a time period, ventilation is required, of which process will be described.

In the ventilation, the air discharge fan 8 and the air supply fan 7 are operated. According to this, the external air is introduced into the room through the air supply duct 3 and the air supply port 1, and the room air is discharged to the outside of the room through the air discharge duct 4 and the air discharge port 2. In this instance, the room air and the external air flowing through the air discharge duct 4 and the air supply duct 3 indirectly heat exchange at the preheat exchanger 6. Therefore, the external air receives a portion of thermal energy from the room air discharged to the outside of the room, before introduction into the room, according to which loss of thermal energy caused by the ventilation can be reduced.

The foregoing air conditioning system of the present invention recovers the thermal energy of the room air discharged to the outside of room with the air supplied to the room in ventilation. According to this, rapid change of the room temperature in the ventilation can be prevented, and an energy saving effect can be obtained. However, despite of the advantages, the air conditioning system described with reference to FIGS. 1 and 3 has the following problems.

First, the air discharge duct in the ceiling in the room is long and complicate, to fail making the indoor unit compact, to be difficult to install, and to require much material and installation cost.

Second, there are a plurality of discharge ports mounted in the ceiling, and the air discharge duct is connected to the ports. According to this, since the air discharge duct is long, heat loss and pressure loss are occurred, that make the preheat exchange efficiency in ventilation poor.

Therefore, an improved air conditioning system that can solve the foregoing problem is provided. FIGS. 5~9 illustrate the improved air conditioning system in accordance with a first preferred embodiment of the present invention. The improved air conditioning system in accordance with a first preferred embodiment of the present invention will be described with reference to above drawings.

Figure 5:
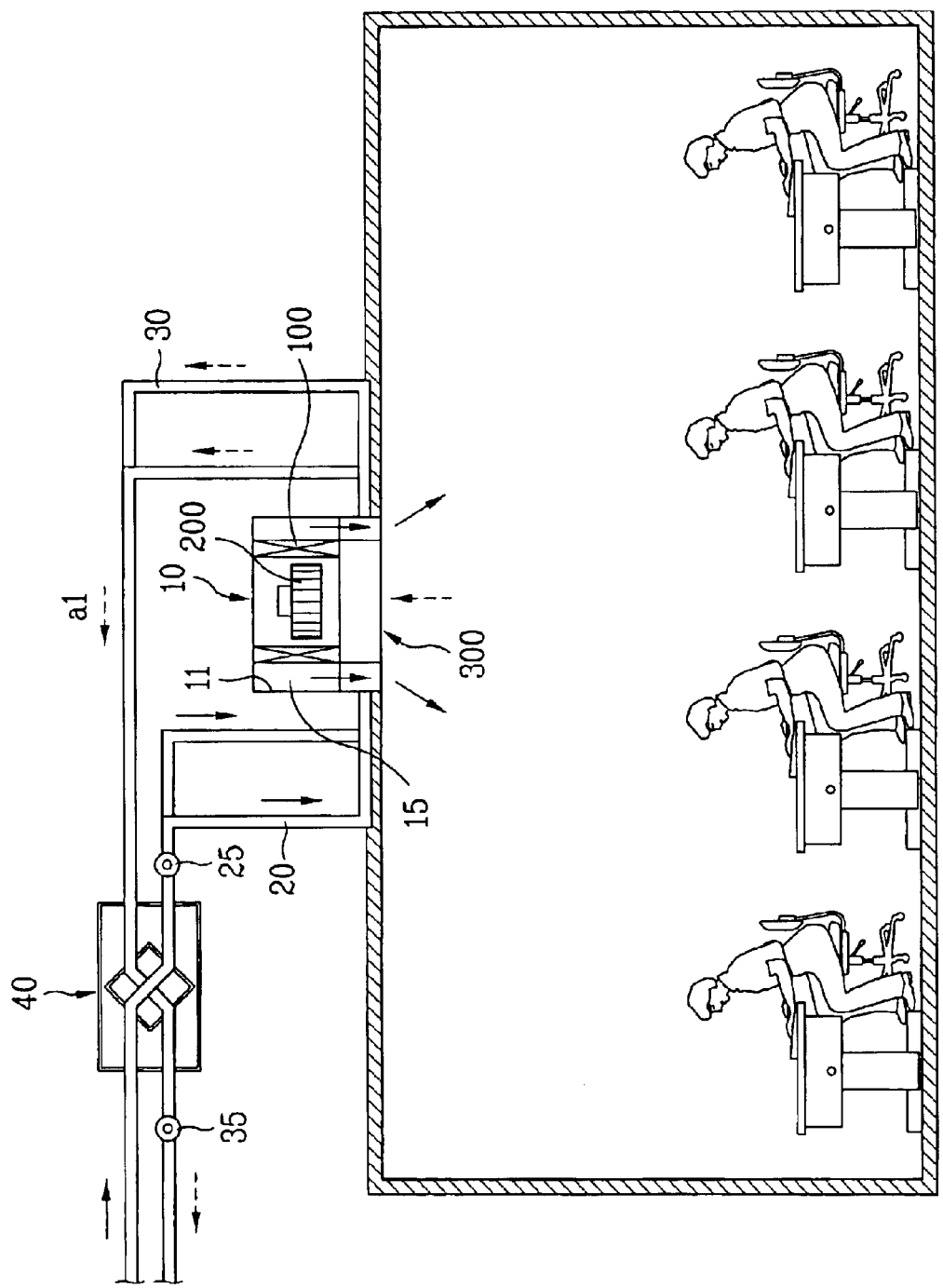
FIG. 5 illustrates an air conditioning system of an improved structure in accordance with a first preferred embodiment of the present invention.

Referring to FIG. 5, the indoor unit 10 is installed at one point in the ceiling in the room so as to be in communication with the room. Ends of the air supply duct 20 and the air discharge duct 30 are mounted to be in communication with an outside of room, respectively. In the middle of the air supply duct 20 and the air discharge duct 30, there is preheat exchanger 40 for indirect heat exchange of the external air and the room air flowing therethrough, respectively. A structure and function of the preheat exchanger 40, similar to one described with reference to FIGS. 3 and 4, will not be described, additionally.

In the meantime, though not shown, the outdoor unit is installed in an outdoor, which includes a compressor, an outdoor expansion device, and an outdoor fan. The outdoor unit, similar to known outdoor unit, will not be described, additionally. Of course, the outdoor unit and the indoor unit 10 are connected with refrigerant pipelines.

Figure 6:
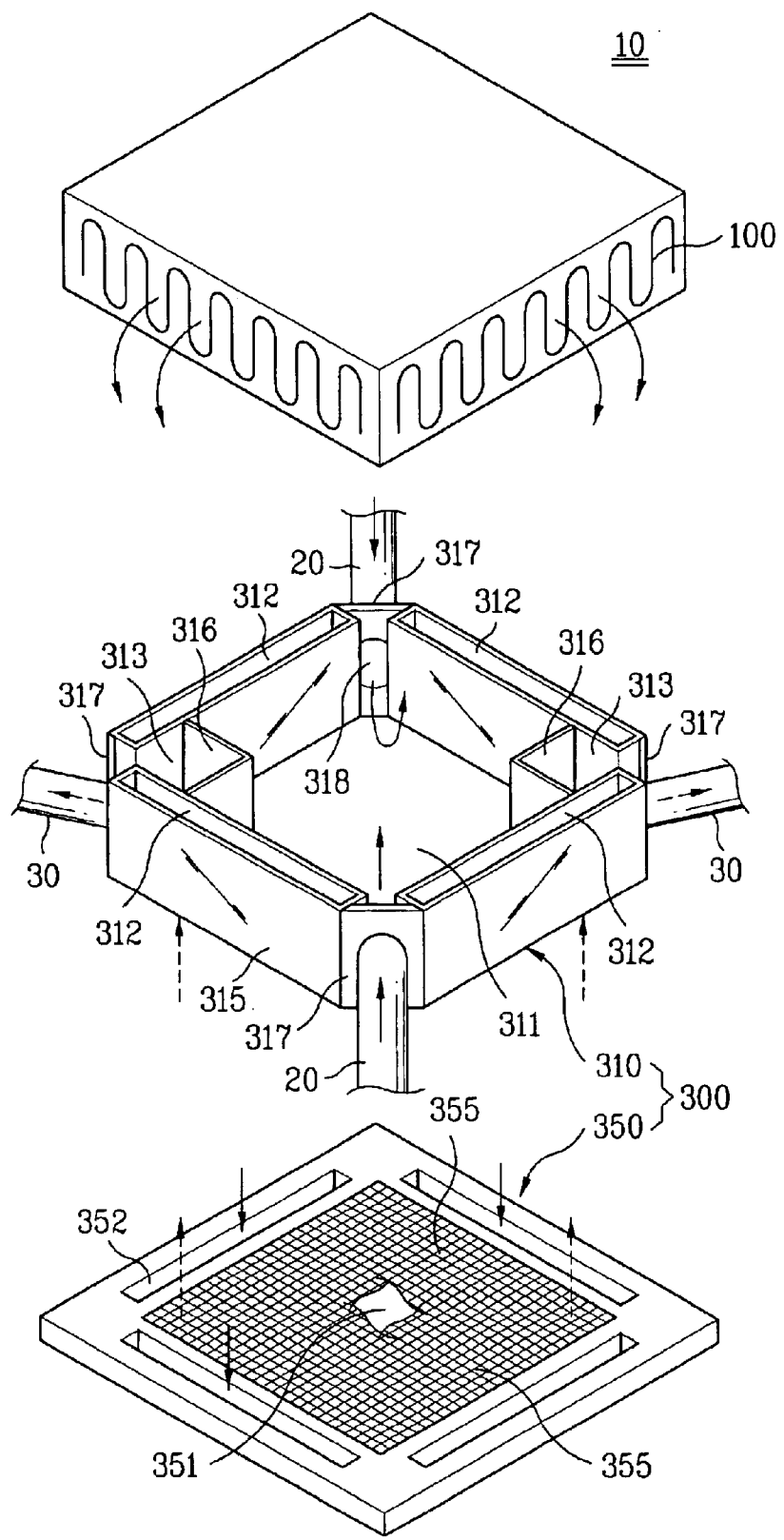
FIG. 6 illustrates a disassembled perspective view of an indoor unit in the air conditioning system in FIG. 5.

In the meantime, referring to FIGS. 5 and 6, the indoor unit 10 includes an indoor heat exchanger 100, a fan 200, and a ventilation duct 300. As shown in FIG. 5, the indoor heat exchanger 100 is mounted in an indoor unit case 11, and has a form with an inside space in communication with the room. The indoor heat exchanger 100 may have a form, for an example, surrounding the space. In this case, the space may be in communication with the room through an opened bottom side of the indoor heat exchanger 100. In the meantime, referring to FIG. 5, it is preferable that an outside circumferential surface of the indoor heat exchanger 100 and an inside circumferential surface of the indoor unit case has a fixed distance, for securing a discharge flow passage 15 so that the air discharged from the fan and passed through the indoor heat exchanger 100 moves toward the room.

Referring to FIG. 5, the fan 200 is mounted in the space in the indoor heat exchanger 100. The fan 200 draws air, and discharges into the room through the indoor heat exchanger 100. In the meantime, it is preferable that the fan 200 provided to the air conditioning system in accordance with a first preferred embodiment of the present invention includes a centrifugal fan that draws air from one side, for an example, from a bottom side, and discharges in a radial direction. In this case, referring to FIG. 5, the centrifugal fan is mounted in the inside space of the indoor heat exchanger 100, for drawing room air through the bottom side and discharges the room air in the radial direction. Then, the air discharged in the radial direction passes through the indoor heat exchanger 100 mounted to surround the centrifugal fan, and moves toward the room.

A ventilation guide duct 300 is mounted under the indoor heat exchanger 100, and has three flow passages for independent guide of the room air, the external air, and the air passed through the indoor heat exchanger 100. The first flow passage guides fresh air from the outside of the room, and the room air to the fan 200. The first flow passage has an upper part in communication with the space, a lower part in communication with the room, and a middle part in communication with the air supply duct 20. A second flow passage guides the air passed through the fan 200 and the indoor heat exchanger 100 to the room. The second flow passage has an upper part in communication with the discharge flow passage 15 and a lower part in communication with the room. A third flow passage, guiding the room air to the air discharge duct 30, has a lower part in communication with the room, and a part in communication with the air discharge duct 30. At least one or more than one of the first, second, and third flow passages are provided, respectively.

Figure 7:
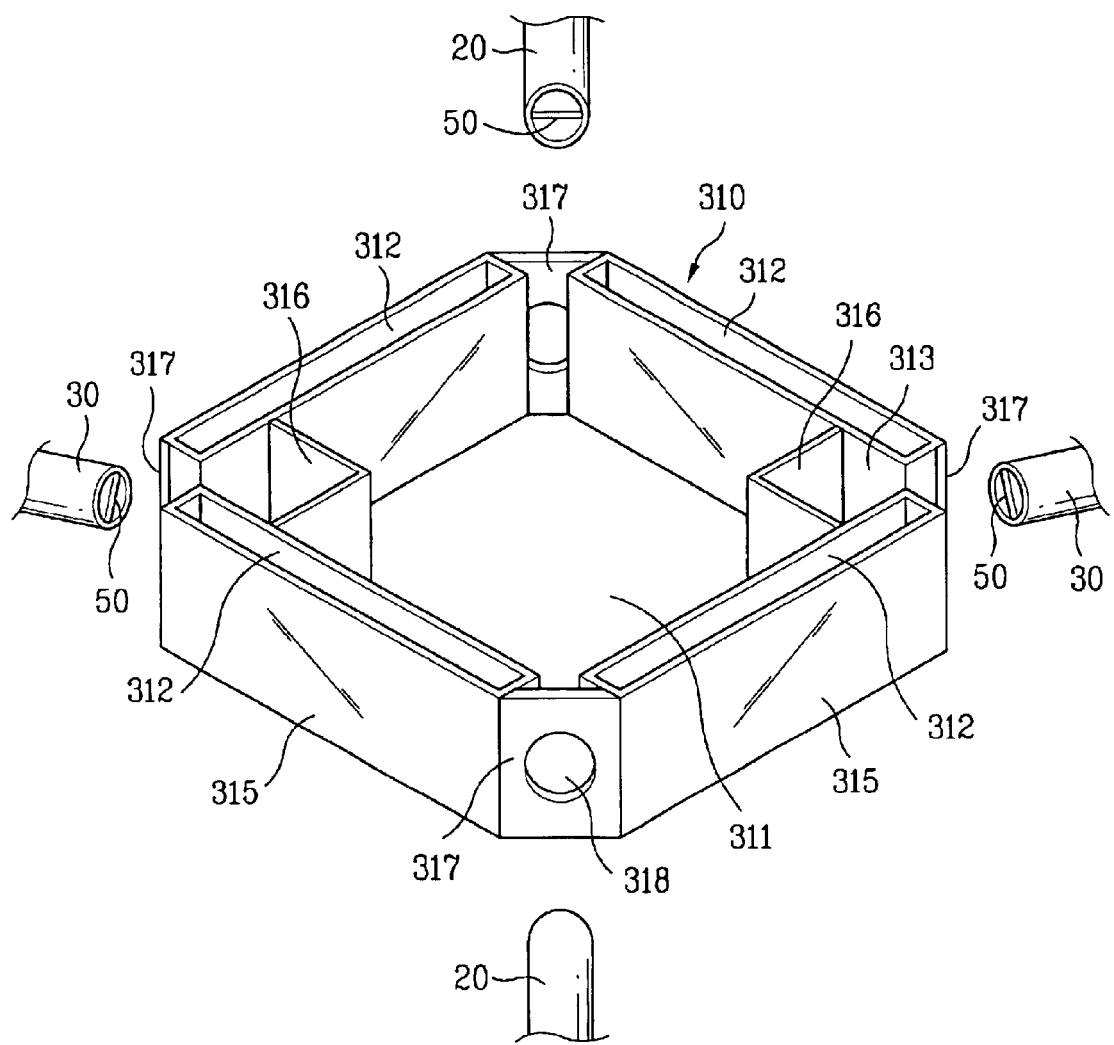
FIG. 7 illustrates a perspective view of a duct body in the air conditioning system in FIG. 5 in accordance with a preferred embodiment of the present invention.

In the meantime, FIGS. 6 and 7 illustrate one preferred embodiment of the ventilation guide duct having the first, second, and third flow passages. As shown in FIG. 6, the ventilation guide duct 300 includes a duct body 310 and a panel 350. The duct body 310 is on an underside of the indoor heat exchanger 100, and the panel 350 is attached to an underside of the duct body 310.

The duct body 310 has three holes forming parts of the first, second, and third flow passages, respectively. The first hole 311, passed through the duct body 310 in an up/down direction, forms a part of the first flow passage. Referring to FIGS. 6 and 7, the first hole 311 is in communication with the space and the air supply duct 20. The second hole 312, arranged around the first hole 311 to pass through the duct body 310 in an up/down direction, forms a part of the second flow passage, and in communication with the discharge flow passage 15. The third hole 313 is arranged around the first hole 311, passed through the duct body 310 in an up/down direction to form a part of the third flow passage, and is in communication with the air discharge duct 30.

If the duct body 310 has above structure, it is preferable that the fan 200 is provided over the first hole 311 and the third hole 313. It is also preferable that the indoor heat exchanger 100 stands on the duct body 310 along positions between the first hole 311 and the second hole 312.

In the meantime, as described, the first, second, and third flow passages in the duct body 310 may be the three holes passed through the duct body 310. In this case, the three holes may be provided in a form the duct body 310 is machined to pass through the duct body 310, however, as shown in FIGS. 6 and 7, the first, second, and third flow passages may be provided in a unique structure in which a plurality of ducts and plates are closely combined, which will be described hereafter.

Referring to FIGS. 6 and 7, the duct body 310 includes a plurality of first ducts 315, and at least one or more than one compartment plate 316. Each of the first ducts 315 has opened both ends, and an inside flow passage arranged in the up/down direction. The plurality of the first ducts 315 surround a central part to form a cavity in the central part that is in communication with the space and the room. The inside flow passages of the first ducts 315 arranged as above provide the second holes 312 respectively, to form a part of the second flow passage.

The compartment plate 316 divides the cavity into the first flow passage and the third flow passage, i.e., the first hole 311 and the third hole 313. As shown in FIGS. 6 and 7, the compartment plate 316 has both ends connected to two first ducts 315 adjacent to each other. Thus, the compartment plate 316 may be flat in full length, or as shown in FIG. 7, may have a form of bent angle such that a part of the compartment plate 316 is projected toward a central part. If the compartment plate 316 has the form of an angle, a size of the third hole 313 can be made greater. If such compartment plates 316 are provided, the first flow passage is formed in a central part of the cavity, and the third flow passage are formed in insides of corners at which the first ducts 315 are connected.

The compartment plate 316 is mounted thus under the following reason. The external air supplied to the first hole 311 through the air supply ducts 20 is supplied to the room through the indoor heat exchanger 100 and the second hole 312 by the fan 200. At the same time with this, polluted room air is introduced through the first hole 311, and discharged to the outside of the room through the air discharge duct 30. In this instance, it there is no compartment plate 316, a portion of the external air introduced into the first hole 311 through the air supply duct 20 is drawn into the air discharge duct 30 directly. In this case, since a ventilation efficiency drops substantially, the present invention suggests mounting of the compartment plate 316, for preventing the supplied external air from being discharged to the outside of the room directly through the air discharge duct 30.

In the meantime, though not shown, the first ducts 315 may be arranged such that sides are connected to sides of the first ducts 315, or as shown in FIG. 7, spaced therefrom. In a case the first ducts 315 are arranged in a state the sides of the first ducts 315 are connected, the third hole 313 is defined as an inside space surrounded with an inside of the corner at which the first ducts 315 are connected and the compartment plate 316. Though not shown, the air discharge duct 30 can be arranged to pass through a part of the first duct 315.

If the first ducts 315 are arranged in a state sides thereof are spaced a distance, the sides of the first ducts 315 arranged adjacent to each other are connected with a connection plate 317 as shown in FIG. 7. In this case, the third hole 313 is defined as an inside space surrounded with the first ducts 315, the connection plate 317, and the compartment plate 316. As shown in FIG. 7, the connection plate 317 has a connection hole 318 for connection to the air supply duct 20 or the air discharge duct 30.

As shown in FIG. 6, the panel 350 includes a first port 351 and a second port 352. The first port 351 is provided to pass through a central part of the panel 350 in an up/down direction to form parts of the first and third flow passages, i.e., so as to be in communication with the first hole 311 and the third hole 313, respectively. Therefore, the first flow passage is defined with the first hole 311 and the first port 351, and the third flow passage is defined with the third hole 313 and the first port 351. It is preferable that there is a mesh 355 formed at the first port 351 for filtering foreign matters since polluted room air passes through the first port 351.

In the foregoing air conditioning system, an air supply fan 25 and an air discharge fan 35 may be mounted on the air supply duct 20 and the air discharge duct 30 respectively, for increasing air supply/discharge capabilities. The air supply duct 20 and the air discharge duct 30 may further include dampers 50 for controlling flow rates of the external air supplied to the room and the room air discharged to the outside of the room, respectively. In this case, as shown in FIG. 7, the damper 50 can be mounted in the air supply duct 20 or in the air discharge duct 30.

Though not shown, the damper 50 may be mounted on a part other than the air supply duct 20 or the air discharge duct 30, for an example, on the ventilation guide duct 300. In this case, the damper 50 may be mounted in a part the air supply duct 20 or the air discharge duct 30 are connected to the ventilation guide duct 300, for an example, on the connection hole 318 in FIG. 7.

In the meantime, as shown in FIG. 5, in the air conditioning system of the present invention, each of the air supply duct 20 and the air discharge duct 30 may have at least one branch duct, respectively. In this case, as shown in FIG. 7, the branch ducts of the air supply duct 20 and the air discharge duct 30 are arranged to be in communication with the first and third flow passages. In FIGS. 6 and 7, reference symbols 20 and 30 denote branch ducts of the air supply duct 20 and the air discharge duct 30, actually.

By providing different numbers of branch ducts of the air supply ducts 20 and the air discharge ducts 30, flow rates of the external air and the room air can differ from each other. For an example, as shown in FIGS. 6 and 7, if the air supply duct 20 and the air discharge duct 30 have the same branch ducts, the flow rates of the external air and the room air can be made the same substantially, which can be applicable to an environment in which a ventilation requires similar air supply rate and air discharge rate. As shown in FIG. 8C, if a number of branch ducts of the air discharge duct 30 is greater than a number of branch ducts of the air supply ducts 20, the discharge rate can be made greater than the supply rate in the ventilation. As shown in FIG. 8D, if the number of branch ducts of the air supply duct 20 is greater than the number of branch duct of the air discharge duct 30, the supply rate can be made greater than the discharge rate in the ventilation.

Figure 8A:
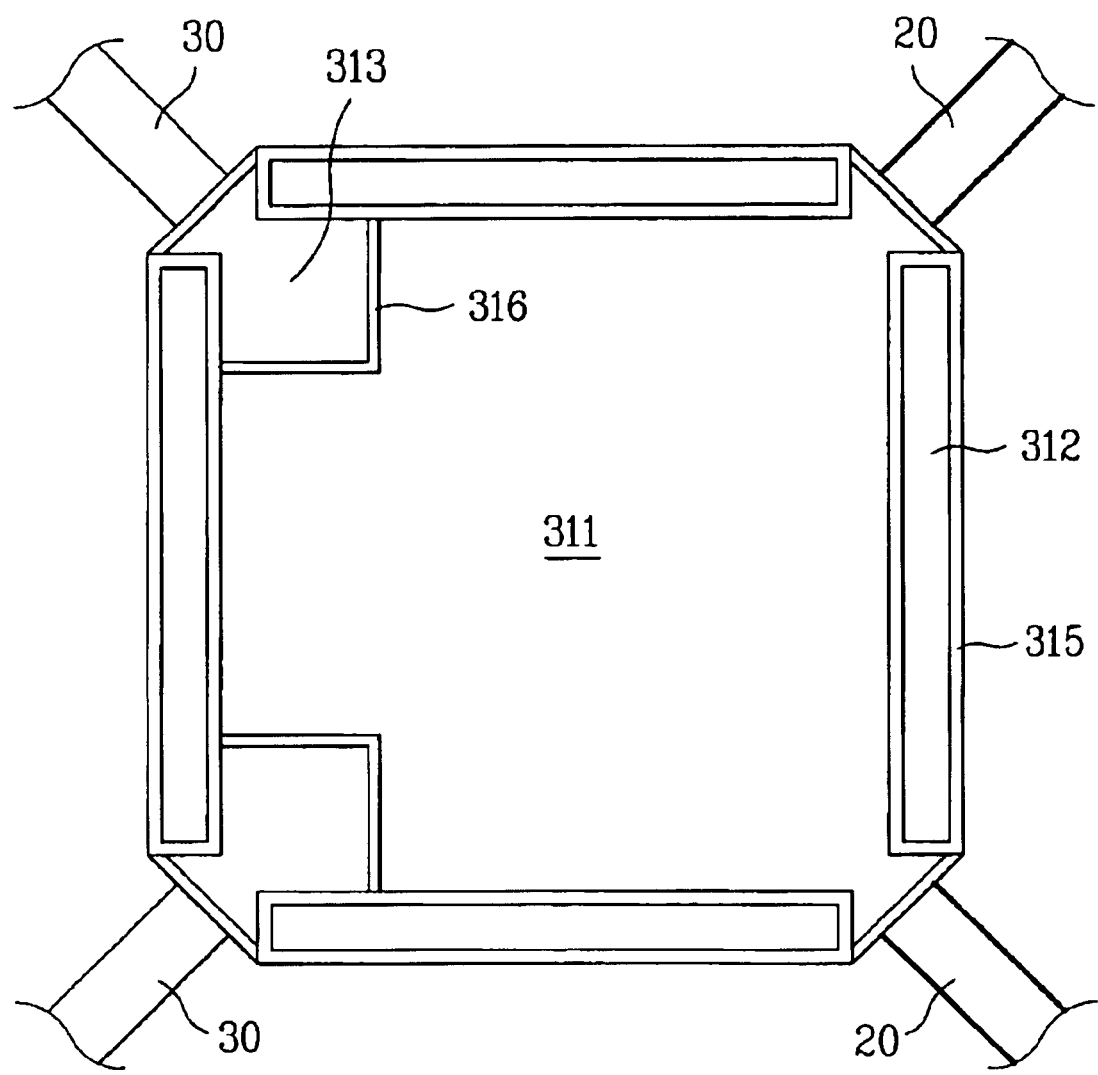
FIGS. 8A~8D illustrate perspective views each showing other embodiment of the duct body in the air conditioning system in FIG. 5.
Figure 8B:
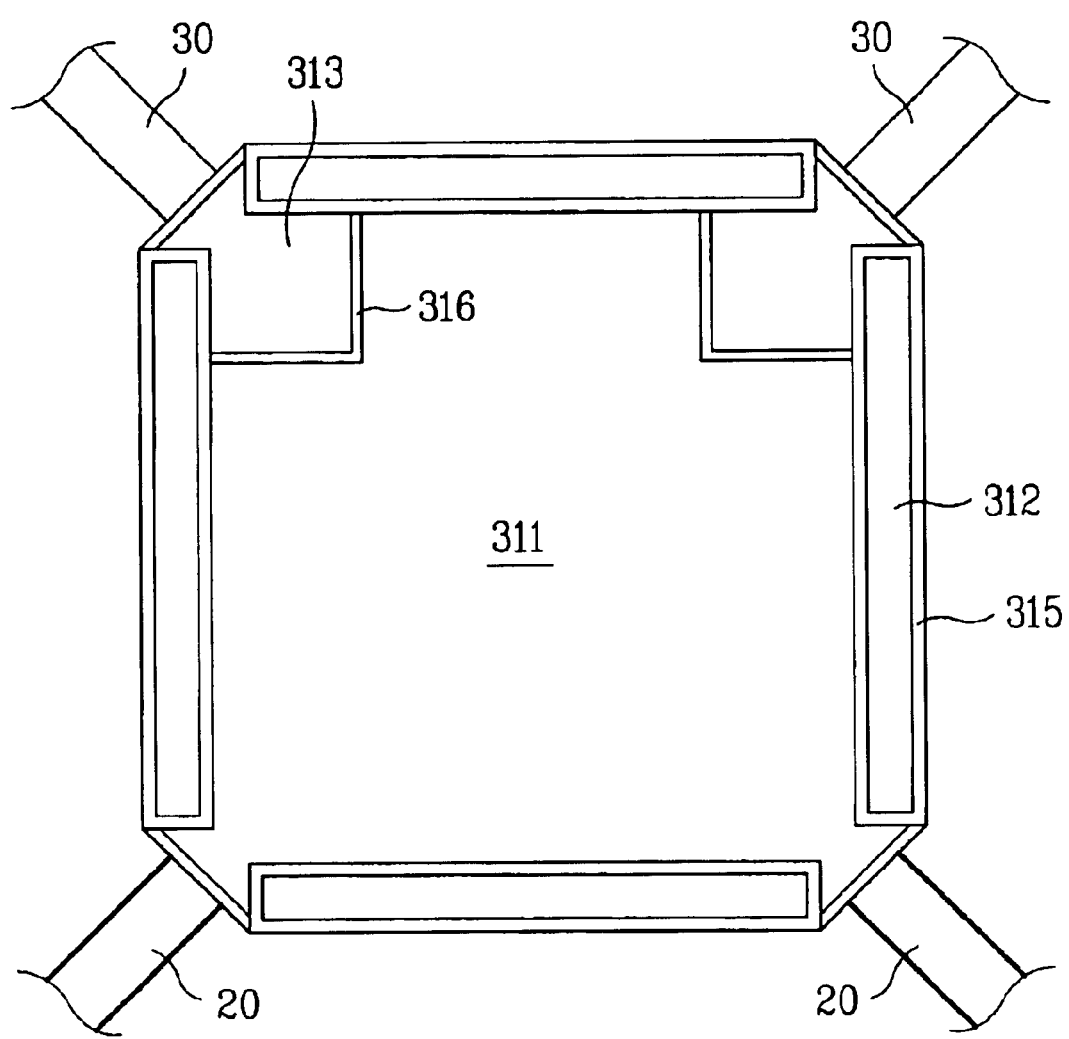
Figure 8C:
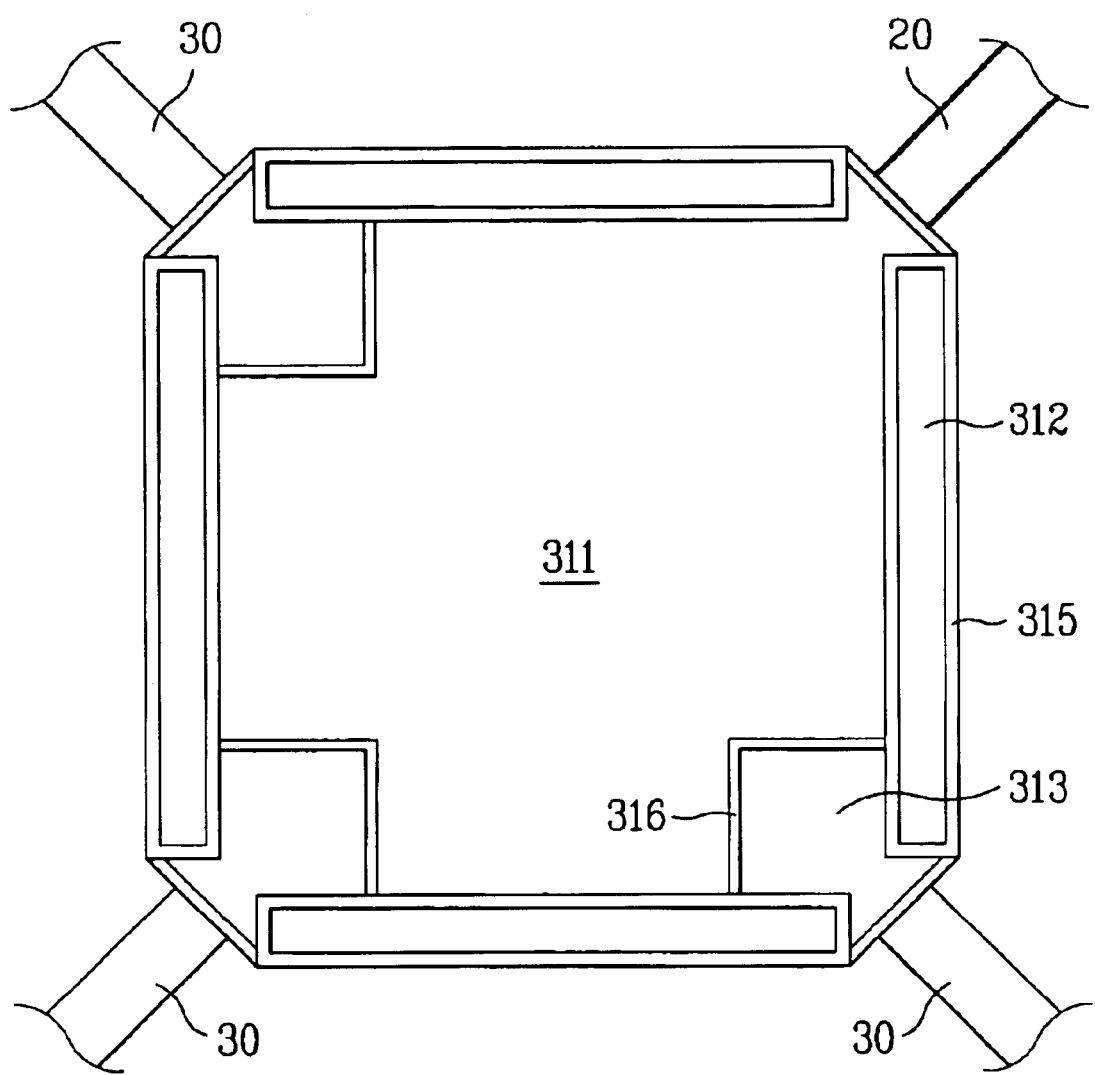
Figure 8D:
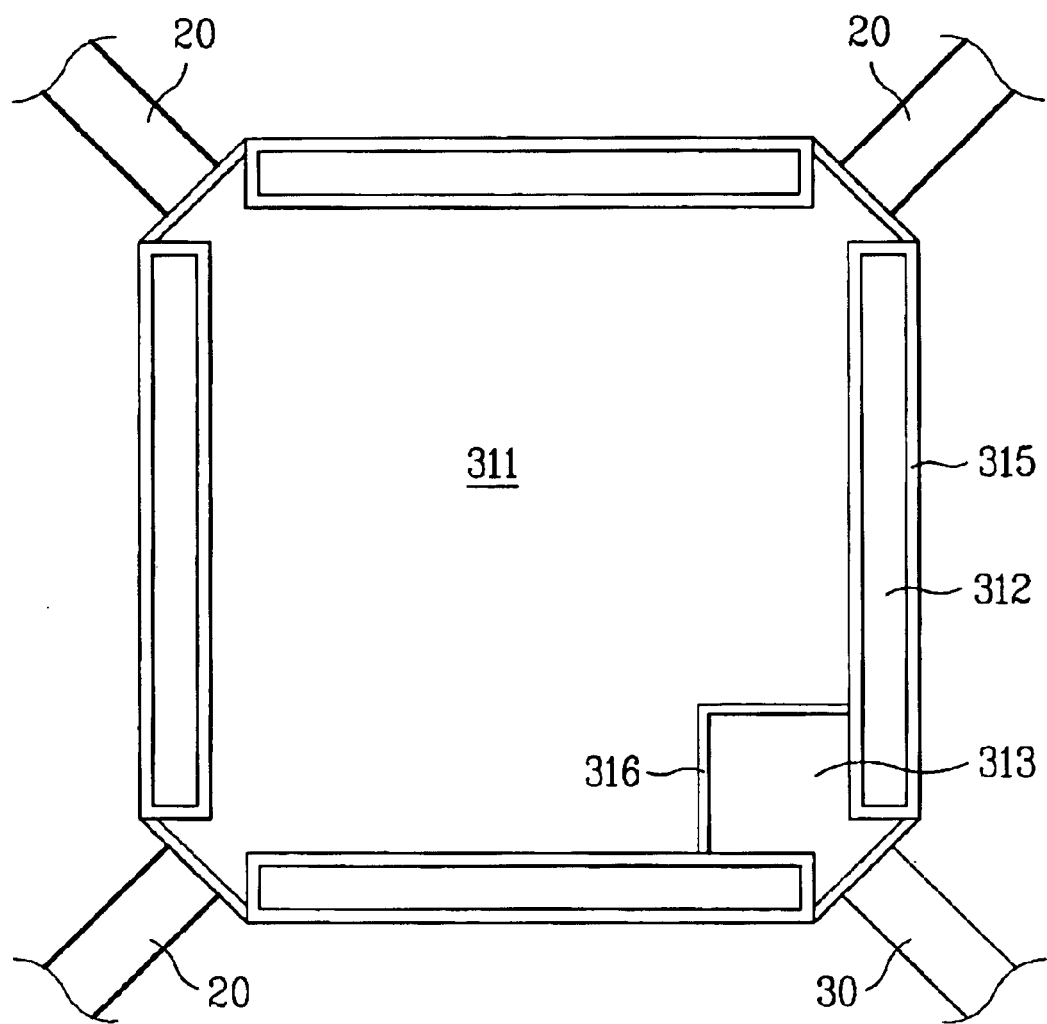

In the meantime, as shown in FIGS. 8A and 8B, in the ventilation guide duct 300 in the air conditioning system of the present invention, the third flow passage can be arranged at a variety of positions. As described with reference to FIGS. 8C and 8D, if the numbers of branch ducts differ from each other, it is required that a number and positions of the third flow passages also change together with a number and positions of the air discharge duct 30. As shown in FIGS. 8A and 8D, as the duct body 310 has a structure of which design can be changed very easily, the duct body 310 can be mounted in any environment, easily.

The operation of the air conditioning system having an improved structure in accordance with the first preferred embodiment of the present invention will be described. When the fan is put into operation in a state the air supply fan 25 and the air discharge fan 35 are not in operation, the room air moves upward through the first hole 311 in the ventilation guide duct 300, and is discharged toward the indoor heat exchanger 100 by the fan. The air cooled down/heated up as the air heat exchanges at the indoor heat exchanger 100 is discharged to the room via the discharge flow passage 15, the second hole 312, and the second port 352, to cool down/heat up the room. In the meantime, since air flow in the air supply duct 20 and the air discharge duct 30 are minimal in a state the air supply fan 25 and the air discharge fan 35 are not in operation, it is difficult to make an efficient ventilation.

In a case it is intended to ventilates the room after the room is cooled or heated for a preset time period through the foregoing process, the air supply fan 25 and the air discharge fan 35 are put into operation. In this instance, the outdoor unit and the indoor unit 10 may be put into operation at the same time, or may not put into operation. A case when the outdoor unit and the indoor unit 10 are put into operation will be described, as an example.

When the air supply fan 25 is put into operation, fresh external air is introduced into the air supply duct 20, and passes through, and receives a thermal energy from the room air at, the preheat exchanger 40. A heat transfer process taken place at the preheat exchanger 40 is the same as described before. The external air passed through the preheat exchanger 40 is introduced into the first hole 311 in the ventilation guide duct 300 through the air supply duct 20 or a branch duct thereof. The external air introduced into the first hole 311 is blown toward the indoor heat exchanger 100 by the fan 200, and heat exchanges at the indoor heat exchanger 100. The external air heated or cooled at the indoor heat exchanger 100 is discharged to the room through the discharge flow passage 15 and the second flow passage of the ventilation guide duct 300, i.e., the second hole 312 and the second port 352.

Thus, in ventilation, the air conditioning system heats or cools the fresh air introduced from the outside of the room at the preheat exchanger 40 primarily, and heats or cools at the indoor heat exchanger 100 secondarily, before supply to the room. Therefore, even in the ventilation, cooled or heated air required according to a room environment is supplied, the sharp room temperature change can be prevented in the ventilation. Moreover, since the external air supplied to the room recovers the thermal energy from the discharge room air, an energy loss can be reduced.

In the meantime, when the discharge fan 35 is put into operation, the room air is introduced into the air discharge duct 30 through the first port 351 and the third hole 313. In this instance, the compartment plate 316 provided to the ventilation guide duct 300 prevents the external air introduced through the first hole from the air supply duct 20 from being introduced into the air discharge duct 30, directly. The room air introduced into the air discharge duct 30 passes through, and heat exchanges with the external air indirectly at, the preheat exchanger 40. In this time, the thermal energy of the room air is transferred to the external air. The room air passed through the preheat exchanger 40 is discharged to the outside of the room in a cooled or heated state.

In the meantime, the air flow rates through the air supply duct 20 and the air discharge duct 30 can be controlled with the damper 50. As shown in FIG. 8C, in a special environment, such as an environment in which a high discharge rate is required, for an example, like a site handling hazardous gas, many branch ducts of the air discharge duct 30 may be arranged. Of course, in an opposite case, many branch ducts of the air supply duct 20 may be arranged.

Advantages of the improved air conditioning system in accordance with a preferred embodiment of the present invention will be described.

First, in ventilation, the air conditioning system of the present invention has the preheat exchanger to transfer the thermal energy of room air discharged to the outside of the room to the external air supplied to the room. According to this, waste of the thermal energy during ventilation can be prevented, effectively.

Second, in ventilation, the external air cooled or heated primarily at the preheat exchanger is cooled or heated again as the external air passes through the indoor heat exchanger, before being supplied to the room. Therefore, the sharp room temperature change in the ventilation can be prevented effectively. According to this, a comfortable environment can be provided to persons in the room.

Third, the air conditioning system of the present invention has the indoor heat exchanger, the indoor fan, the ventilation guide duct, which form an indoor unit assembly. Therefore, the indoor unit is very compact, permitting easy installation of the indoor unit in the ceiling.

Fourth, the air conditioning system of the present invention can dispense with the air supply ports or the air discharge ports mounted in the ceiling. Accordingly, a number of ducts are fewer, and a total length of the ducts is shorter. Therefore, installation is easy, and material and fabrication costs can be reduced. Moreover, heat loss and pressure loss occurred at the ducts can be reduced, to improve an air conditioning efficiency.

Fifth, since the air conditioning system of the present invention can dispense with separate air discharge ports, a room interior looks better.

Sixth, air supply rate and discharge rate control is made is with the dampers in the air supply duct and the air discharge duct. Also, a design change is very easy, in which an air supply rate and an air discharge rate are provided differently, if necessary.

Seventh, the compartment plate separates flow passages of the room air and the external air. Thus, only with very simple element, a structure can be provided, in which ventilation efficiency can be increased, and energy consumption can be reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An air conditioning system comprising:
    an outdoor unit having a compressor and an outdoor heat exchanger;
    an indoor unit installed in a ceiling, the indoor unit comprising:
        an indoor heat exchanger defining a space therein in communication with a room;
        a fan in the space that draws air in and that discharges air to the room through the indoor heat exchanger; and
        a ventilation guide duct on an underside of the indoor heat exchanger, the ventilation guide duct guiding external air to the room through the fan and room air from the room;
    an air supply duct and an air discharge duct each having one end connected to the ventilation guide duct for guiding the external air to the room and the room air from the room, respectively; and
    a preheat exchanger provided between the air supply duct and the air discharge duct, the preheat exchanger indirectly exchanging heat between external air and room air passing through the air supply duct and the air discharge duct.

2. The air conditioning system as claimed in claim 1, wherein the fan includes a centrifugal fan that draws air from below the fan and discharges in a radial direction as the fan rotates.

3. The air conditioning system as claimed in claim 1, wherein the ventilation guide duct includes:
    at least one first flow passage in communication with the space, the room, and the air supply duct, the first flow passage guiding the external air to the fan and the room air from the room;
    at least one second flow passage that guides the air passed through the fan and the indoor heat exchanger to the room, and
    at least one third flow passage that guides the room air to the air discharge duct.

4. The air conditioning system as claimed in claim 3, wherein the air supply duct and the air discharge duct each include at least one branch duct connected to the first flow passage and the third flow passage, respectively.

5. The air conditioning system as claimed in claim 4, wherein the air supply duct and the air discharge duct include the same number of branch ducts to obtain the same flow rates.

6. The air conditioning system as claimed in claim 4, wherein the air discharge duct includes a number of branch ducts greater than a number of branch ducts of the air supply duct, so that a room air discharge rate from the room is higher than an external air supply rate into the room.

7. The air conditioning system as claimed in claim 4, wherein the air supply duct includes a number of branch ducts greater than a number of branch ducts of the air discharge duct, so that an external air supply rate into the room is higher than a room air discharge rate from the room.

8. The air conditioning system as claimed in claim 3, wherein the ventilation guide duct includes:
    a duct body on an underside of the indoor heat exchanger, and
    a panel attached to an underside of the duct body.

9. The air conditioning system as claimed in claim 8, wherein the duct body includes.
    a first hole provided in a central part thereof, extending in an up/down direction, and forming a part of the first flow passage in communication with the air supply duct,
    a second hole provided around the first hole, extending in the up/down direction, and forming a part of the second flow passage, and
    a third hole provided around the first hole, extending in the up/down direction, and forming a part of the third flow passage in communication with the air discharge duct.

10. The air conditioning system as claimed in claim 8, wherein the duct body includes:
    first ducts surrounding a central part of the duct body to form a cavity in the central part that is in communication with the space and the room, each of the first ducts having an inside forming a part of the second flow passage, and
    a compartment plate arranged to divide the cavity into the first flow passage and the third flow passage.

11. The air conditioning system as claimed in claim 10, wherein the duct body further includes connection plates connecting side ends of adjacent first ducts, and
wherein one of the air supply duct and the air discharge duct is connected selectively to the duct body.

12. The air conditioning system as claimed in claim 10, wherein the first flow passage is formed in a central part of the cavity, and the third flow passage is formed inside of a corner at which the first ducts are connected.

13. The air conditioning system as claimed in claim 10, wherein the compartment plate has two ends connected to two adjacent first ducts.

14. The air conditioning system as claimed in claim 8, wherein the panel includes:
a first port forming parts of the first and third flow passages, and
a second port forming a part of the second flow passage.

15. The air conditioning system as claimed in claim 14, wherein the panel further includes a mesh provided to the first port.

16. The air conditioning system as claimed in claim 9, wherein the fan is provided over the first hole.

17. The air conditioning system as claimed in claim 9, wherein the indoor heat exchanger is located on the duct body along a position between the first hole and the second hole.

18. The air conditioning system as claimed in claim 1, further comprising an air supply fan on the air supply duct for supplying external air into the room.

19. The air conditioning system as claimed in claim 1, further comprising an air discharge fan on the air discharge duct for discharging room air from the room.

20. The air conditioning system as claimed in claim 1, further comprising a damper in the air supply duct for controlling a flow rate of external air supplied to the room.

21. The air conditioning system as claimed in claim 1, further comprising a damper in the air discharge duct for controlling a flow rate of room air discharged from the room.

22. The air conditioning system as claimed in claim 3, wherein the ventilation guide duct further includes a damper mounted in a part connected to the air supply duct for controlling a flow rate of external air supplied to the room.

23. The air conditioning system as claimed in claim 3, wherein the ventilation guide duct further includes a damper, mounted in a part connected to the air discharge duct, for controlling a flow rate of the room air discharged from the room.

* * * * *

UNITED STATES PATENT AND TRADEMARK OFFICE
CERTIFICATE OF CORRECTION

PATENT NO. : 6,874,334 B2
DATED : April 5, 2005
INVENTOR(S) : Kim et al.

It is certified that error appears in the above-identified patent and that said Letters Patent is hereby corrected as shown below:

Column 12,
Line 46, "." should be -- : --.

Signed and Sealed this

Twenty-seventh Day of December, 2005

JON W. DUDAS
*Director of the United States Patent and Trademark Office*